United States Patent
Gharpure et al.

(10) Patent No.: US 10,872,099 B1
(45) Date of Patent: Dec. 22, 2020

(54) AUTOMATIC DATA PROTECTION FOR VIRTUAL MACHINES USING VIRTUAL MACHINE ATTRIBUTES

(71) Applicant: Tintri by DDN, Inc., Santa Clara, CA (US)

(72) Inventors: Geeta Gharpure, Sunnyvale, CA (US); Alexandre Nichet, San Jose, CA (US); Deepika Dixit, San Jose, CA (US)

(73) Assignee: Tintri by DDN, Inc., Santa Clara, CA (US)

( * ) Notice: Subject to any disclaimer, the term of this patent is extended or adjusted under 35 U.S.C. 154(b) by 190 days.

(21) Appl. No.: 15/877,072

(22) Filed: Jan. 22, 2018

Related U.S. Application Data

(60) Provisional application No. 62/449,942, filed on Jan. 24, 2017.

(51) Int. Cl.
- *G06F 16/20* (2019.01)
- *G06F 16/27* (2019.01)
- *G06F 9/455* (2018.01)

(52) U.S. Cl.
CPC .......... *G06F 16/27* (2019.01); *G06F 9/45558* (2013.01); *G06F 2009/45587* (2013.01)

(58) Field of Classification Search
None
See application file for complete search history.

(56) References Cited

U.S. PATENT DOCUMENTS

| | | | | |
|---|---|---|---|---|
| 6,233,449 | B1* | 5/2001 | Glitho | H04Q 3/0075 455/423 |
| 8,924,352 | B1* | 12/2014 | Andruss | G06F 11/1461 707/640 |
| 9,122,417 | B1* | 9/2015 | Hellwege | G06F 3/067 |
| 9,367,561 | B1* | 6/2016 | Dutch | G06F 11/1469 |
| 9,449,281 | B2* | 9/2016 | Basel | G06N 20/00 |
| 2005/0086445 | A1* | 4/2005 | Mizuno | G06F 11/1451 711/162 |
| 2008/0046483 | A1* | 2/2008 | Lehr | G06F 11/1451 |
| 2010/0169948 | A1* | 7/2010 | Budko | G06F 21/53 726/1 |
| 2014/0052694 | A1* | 2/2014 | Dasari | G06F 16/23 707/654 |
| 2014/0081920 | A1* | 3/2014 | Itasaki | G06F 16/178 707/654 |

(Continued)

OTHER PUBLICATIONS

Author Unknown, Turbonomic Our Hybrid Cloud Management Platform Transforms IT, Sep. 14, 2017, http://web.archive.org/web/20170914164935/https://turbonomic.com/product/.

(Continued)

*Primary Examiner* — Jau Shya Meng
(74) *Attorney, Agent, or Firm* — Van Pelt, Yi & James LLP

(57) ABSTRACT

An embodiment of a system for automatic data protection for virtual machines includes a processor configured to use storage attributes associated with a virtual machine to determine, for the virtual machine, a data protection priority. The processor is further configured to determine a recommendation of a data protection operation to be taken with respect to the virtual machine based at least in part on the determined data protection priority. The system further includes a memory coupled to the processor and configured to store the determined data protection priority.

22 Claims, 6 Drawing Sheets

(56) References Cited

U.S. PATENT DOCUMENTS

| | | | | |
|---|---|---|---|---|
| 2015/0095102 A1* | 4/2015 | Hanley | ............. | G06Q 10/0635 |
| | | | | 705/7.28 |
| 2015/0134717 A1* | 5/2015 | Naganuma | .......... | G06F 11/1464 |
| | | | | 709/201 |
| 2015/0278024 A1* | 10/2015 | Barman | ............. | G06F 11/1466 |
| | | | | 707/634 |
| 2016/0373291 A1* | 12/2016 | Dornemann | ............ | H04L 67/28 |

OTHER PUBLICATIONS

Author Unknown, VMWARE vSAN 6.6 Evolve without Risk to Secure Hyper-Converged Infrastructure, Mar. 2017.

* cited by examiner

200

300

600

US 10,872,099 B1

AUTOMATIC DATA PROTECTION FOR VIRTUAL MACHINES USING VIRTUAL MACHINE ATTRIBUTES

CROSS REFERENCE TO OTHER APPLICATIONS

This application claims priority to U.S. Provisional Patent Application No. 62/449,942 entitled METHOD TO FACILITATE AUTOMATIC DATA PROTECTION FOR VIRTUAL MACHINES USING VIRTUAL MACHINE ATTRIBUTES filed Jan. 24, 2017 which is incorporated herein by reference for all purposes.

BACKGROUND OF THE INVENTION

As computer systems and computing infrastructures evolve, new challenges for protecting the data stored in these systems emerge. For example, cloud computing platforms and servers may be managed using virtual machines. Automatic data protection can be deployed, for example by backing up or recovering data using a versioning system. The effectiveness and efficiency of automatic data protection depends on how the versioning system is implemented. For example, a versioning system that captures unimportant data or that captures data too frequently may slow down a data protection process without adding significant effectiveness. Thus, there is a need to automate a data protection process and improve the efficiency and effectiveness of data protection.

BRIEF DESCRIPTION OF THE DRAWINGS

Various embodiments of the invention are disclosed in the following detailed description and the accompanying drawings.

DETAILED DESCRIPTION

Figure 1:
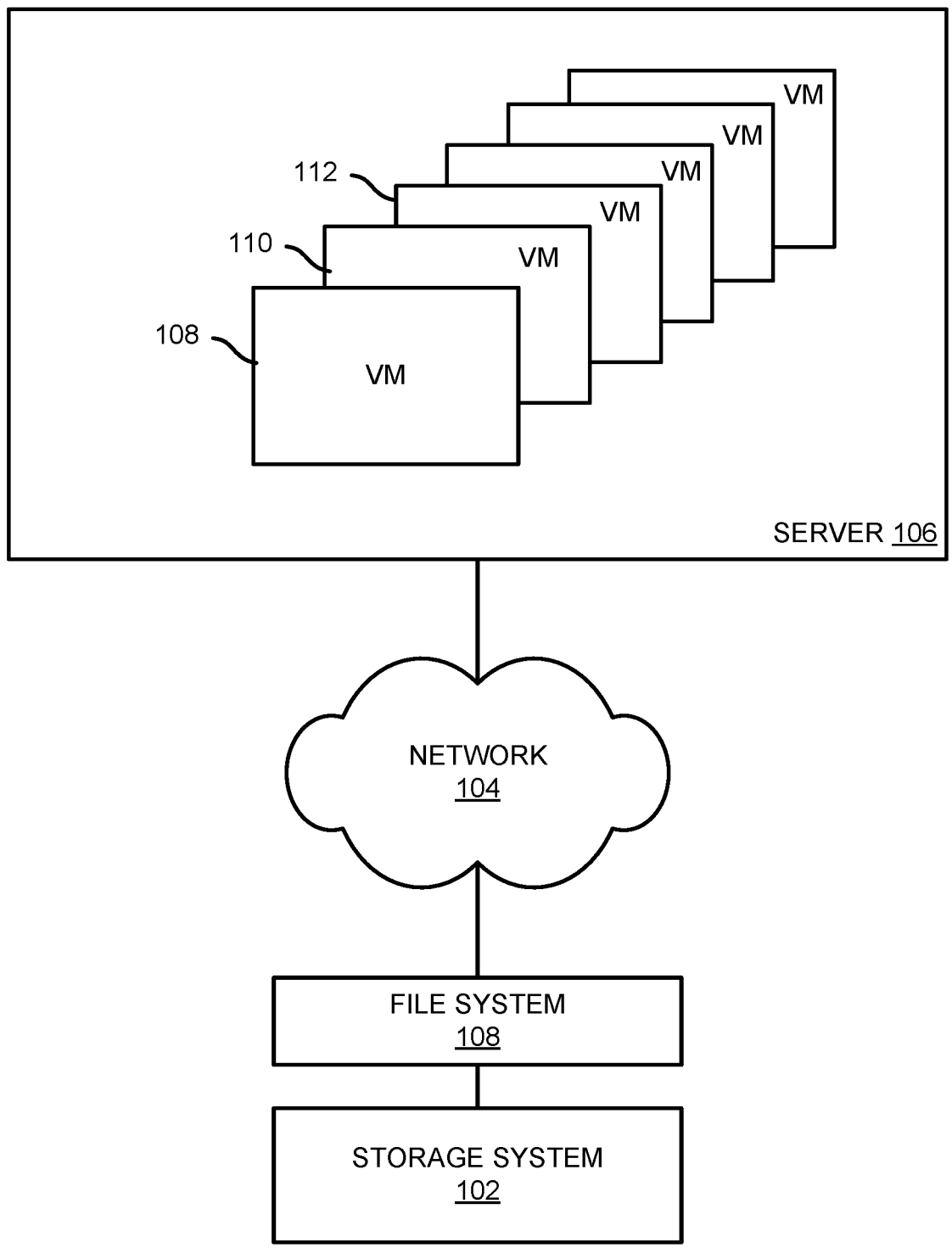
FIG. 1 is a block diagram showing an embodiment of a VM-aware storage system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Data protection measures allow data to be backed up or reconstructed. Replication involves copying data from one device to another. Recovery involves reconstructing lost data. It can be challenging to implement data protection in virtualized environments, especially deploying data protection at scale. In one aspect, a single data protection policy in which a uniform measure is applied to all virtual machines (VMs) in a system might be too static because the VMs may have differing characteristics such as varying importance. VMs of varying importance may have different data protection needs. For example, more important data can be better protected by backing the data more frequently than less important data. Manually setting up different policies per VM or per VM group can be taxing for the manual operator. In addition, data protection resources may be limited. For example, in some systems the number of versions or snapshots that can be stored at any given time is limited (e.g., only 128 snapshots per file are permitted). Snapshots are more fully described with respect to FIG. 2.

Automatic data protection for VMs is disclosed. In various embodiments, a recommendation of a data protection operation (e.g., a snapshot) is determined based on a data protection priority, where the data protection operation is to be taken with respect to the VM. The data protection priority is determined based on storage attributes associated with an VM. In some embodiments, the storage attributes are collected on a per-VM basis. Storage attributes may be collected or derived, as more fully described herein. In various embodiments, machine learning/data mining techniques can be applied to historical data to assist determination of VM priorities and recommendations for protection. Automatically detecting, protecting, and/or recommending protection based on a determined priority of a VM improves data protection by providing protection where it is more needed, using limited resources efficiently, and can be applied to various computing systems including large-scale systems.

FIG. 1 is a block diagram showing an embodiment of a VM-aware storage system. In the example shown, the system includes server 106, network 104, filesystem 108, and storage system 102.

Server 106 is configured to run one or more VMs. In the example shown, VMs 108, 110, and 112 (and other VMs) are running on server 106. A VM is a software implementation of a physical machine that executes programs like a physical machine. For example, a physical machine (e.g., a computer) may be provisioned to run more than one VM. Each VM may run a different operating system. As such, different operating systems may concurrently run and share the resources of the same physical machine. In various embodiments, a VM may span more than one physical machine and/or may be moved (e.g., migrated) from one physical machine to another. In various embodiments, a VM includes one or more virtual disks and other data related to the specific VM (e.g., configuration files and utility files for implementing functionality, such as snapshots, that are supported by the VM management infrastructure). A virtual disk appears to be an ordinary physical disk drive to the guest operating system running on a VM. In various embodiments, one or more files may be used to store the contents of virtual disks.

In various embodiments, a VM management infrastructure (e.g., a hypervisor) creates files and associated metadata such as snapshots. In various embodiments, data associated with a particular VM is stored on a storage system as one or more files. In various embodiments, the files are examples of virtual machine storage abstractions. In some embodiments, the respective files associated with (at least) VMs 108, 110, and 112 running on server 106 are stored on storage system 102.

In various embodiments, filesystem 108 interface with storage system 102, determines and organizes data for storage on storage system 102. For example, the storage system 108 may be instructed by filesystem 102 to store metadata identifying which stored data objects, such as files or other virtual machine storage abstractions, are associated with which VM or virtual disk on storage system 102. This makes the storage system aware of VMs associated with stored files, and the storage system is sometimes referred to as a VM-aware storage system. In various embodiments, storage system 102 stores the data of VMs running on server 106, metadata that provides mapping or other identification of which data objects are associated with which specific VMs, snapshots of the VMs, which snapshots may be taken based on recommendations made according to the processes further described herein. In various embodiments, mapping or identification of specific VMs includes mapping to the files on the storage that are associated with each specific VM. In various embodiments, storage system 102 also stores at least a portion of the files associated with the specific VMs in addition to the mappings to those files. An example of a filesystem is filesystem 220 shown in FIG. 2.

Storage system 102 includes one or more physical systems and/or associated hardware and/or software components configured to work together to store and manage stored data, such as files or other stored data objects. In some embodiments, a hardware component that is used to (at least in part) implement the storage system may be comprised of either disk or flash, or a combination of disk and flash.

Network 104 may be implemented by various high-speed data networks and/or telecommunications networks. In some embodiments, storage system 102 communicates with server 106 via network 104. In some embodiments, the VM-aware storage system does not include network 104, and storage system 102 is a component of server 106. In some embodiments, server 106 is configured to communicate with other storage systems (not shown) in addition to storage system 102.

Figure 2:
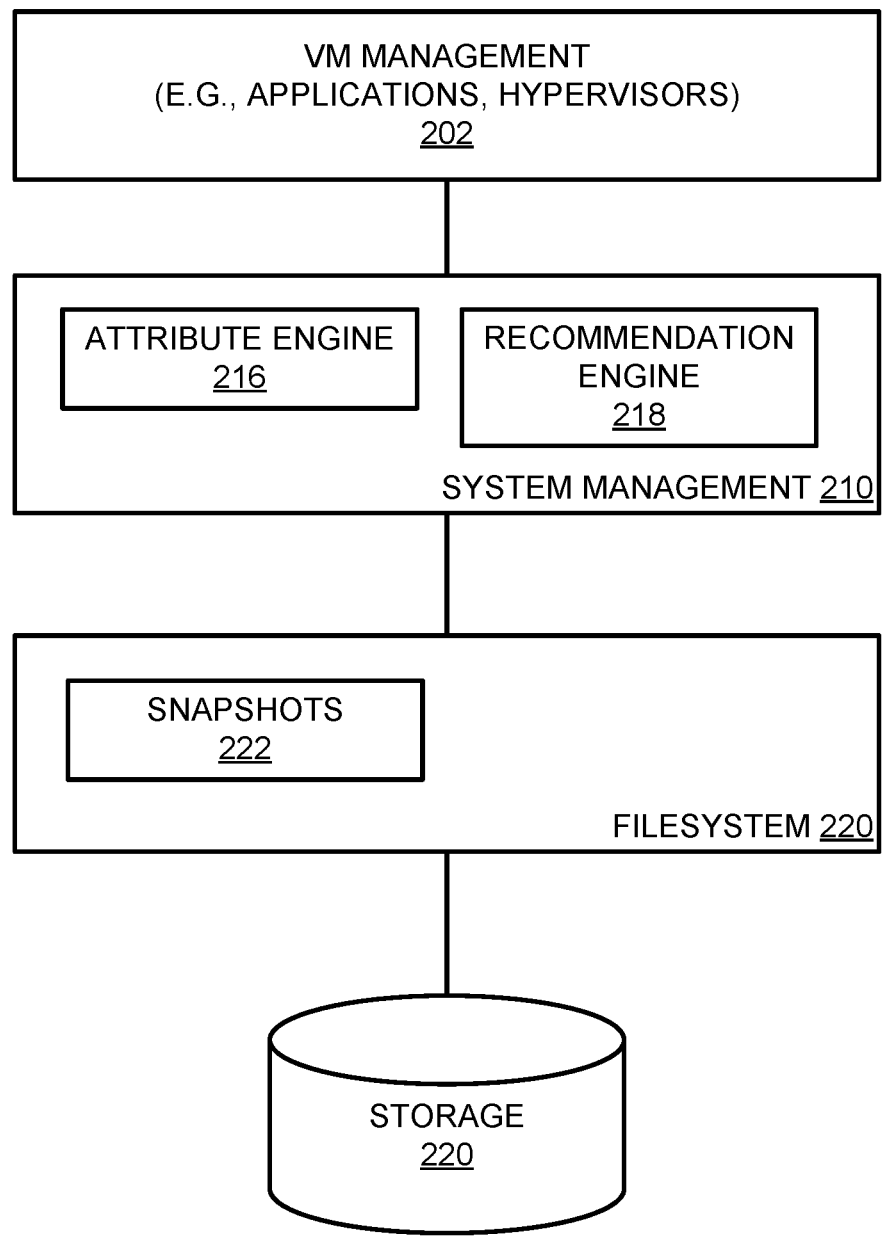
FIG. 2 is a block diagram showing an embodiment of a system for automatic data protection for virtual machines.

FIG. 2 is a block diagram showing an embodiment of a system for automatic data protection for virtual machines. In this example, system 200 includes one or more applications/hypervisors 202, system management 210, filesystem 220, and storage 220.

In various embodiments, system 200 has characteristics that can be leveraged to provide automatic data protection. In some embodiments, filesystem 220 and system management 210 are VM-aware. This means that, unlike typical storage systems, from the perspective of the storage system, there is awareness of the VMs being hosted. The filesystem and system management can communicate with specific VMs via respective APIs. This allows the system management 220 to collect attributes about VMs to make recommendations about data protection operations, as more fully described herein. In some embodiments, system 200 maintains quality of service ("QoS") on a per-VM basis meaning that the QoS specified by each VM can be met by the system without impairing the QoS of other VMs. For example, system 200 is resilient to noisy neighbor issues. The QoS can be a user-specified input including an external input.

VM management 202 (e.g., applications, hypervisors) is configured to create the files that store the contents of virtual disks (e.g., guest operating system, program files and data files) and other data associated with a specific VM. For example, the hypervisor may create a set of files in a directory for each specific VM. Examples of files created by the hypervisor store the content of one or more virtual disks, the state of the VM's BIOS, information and metadata about snapshots created by the hypervisor, configuration information of the specific VM, etc. VM management 202 in various embodiments makes filesystem calls such as read, write, and the like, which calls are serviced by the system management 210, filesystem 220, and storage 220.

Filesystem 220 is configured and optimized to store VM data and take snapshots. Filesystem 220 handles file requests and file operations from the VM management 202 by obtaining the data stored in storage 220 relevant to the file requests/operations. In various embodiments, the filesystem 210 makes the storage system VM aware by associating stored data objects, such as files or other virtual machine storage abstractions with a specific VM on storage system 220. The filesystem 220 may be provided in a system such as the one shown in FIG. 1. In this example, filesystem 220 includes snapshots 212.

Snapshots 222 refer to snapshots stored in filesystem 210, which snapshots are associated with various VMs. A snapshot captures a state of a set of data at a point-in-time when the snapshot is taken. A set of data may be associated with a VM, a virtual disk, a file, or the like. With reference to a snapshot of a VM, the snapshot captures the state of the VM and its constituent files at a particular point-in-time. Snapshots may be associated with a set of data by storing the snapshots as metadata for the set of data (e.g., a VM, a virtual disk, or a file). A snapshot may be created manually or automatically scheduled to be taken. Creating point-in-time snapshots of VMs provide versioning by allowing reconstruction/access to a VM and its application data at the specific date and time of the given snapshot.

Sometimes, a snapshot may be referred to as a type of data protection operation because snapshots may be used for replication, recovery, and other data protection measures. Replication copies VMs or changed blocks. Snapshots facilitate replication of data by allowing data of a first filesystem to be copied to a second filesystem. Replication finds application in a variety of situations including when a user backs up its filesystems by replicating data from a first filesystem to a second filesystem. Replications can be performed on a system-wide basis, per-VM basis, or for a group of VMs (e.g., those VMs having a specified prefix).

Recovery restores an entire VM, virtual disk, or operating system folder/file when data is lost such as when a VM crashes or recovery is otherwise needed. Snapshots facilitate recovery of data by allowing a filesystem to be restored back to the point-in-time associated with a snapshot. In some instances, data can be recovered by implementing a periodic replication procedure such as replicating data in every 5$^{th}$ snapshot.

System management 210 is configured to aggregate storage attributes and recommend data protection operations. For example, system management 210 may be configured to perform the processes described herein and instruct the filesystem 220 to take a snapshot (e.g., at an appointed frequency or of particular content). System management 210 includes attribute engine 216 and recommendation engine 218.

Attribute engine 216 is configured to collect storage attributes. For example, attributes may be collected based on observation of system operations. Attributes include metrics and/or metadata associated with a stored object associated with the storage system such as namespace, file names, and the like. The attributes may be static or may change over time. Attribute engine 216 can collect metrics using a VM-level API. Attribute engine 216 is configured to report specific VM attributes and to identify a specific associated VM because the monitoring engine is VM aware. Collection of storage attributes is further described herein with respect to FIG. 3.

Figure 3:
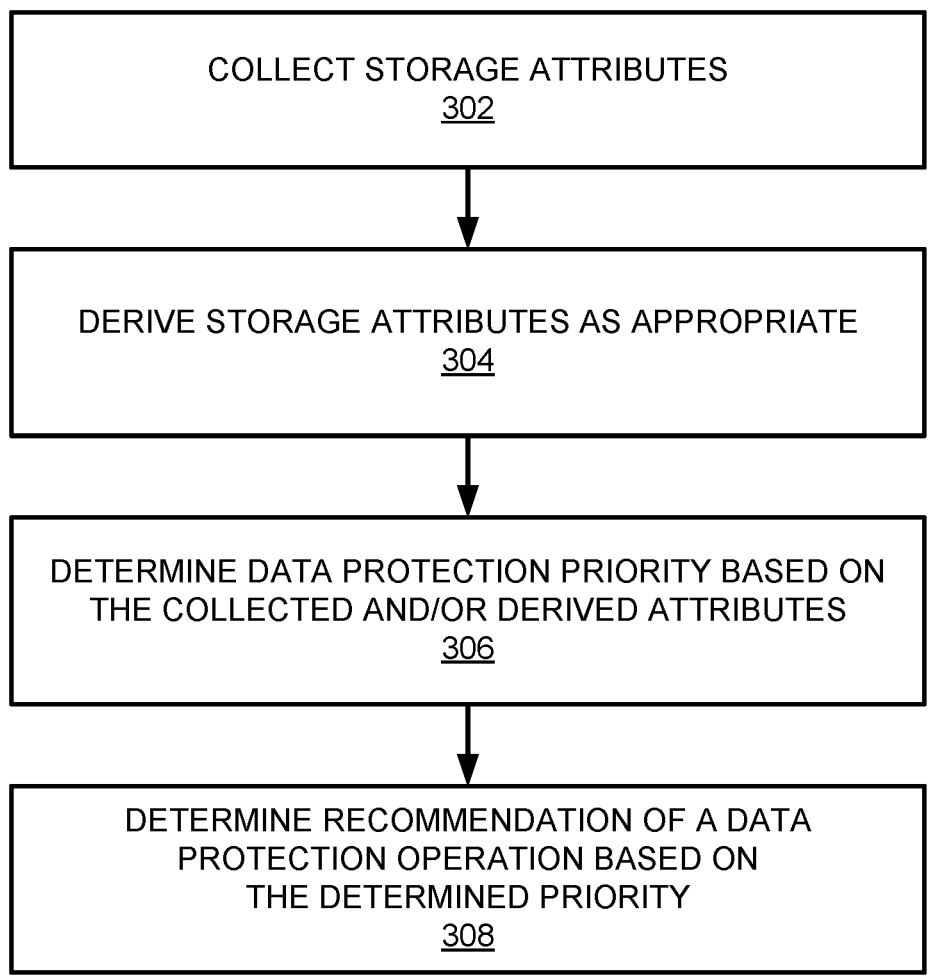
FIG. 3 is a flow chart illustrating an embodiment of a process for providing automatic data protection for virtual machines.

Attribute engine 216 is configured to derive attributes/predictors (e.g., from collected attributes) such as block size and name cluster, as further described with respect to FIG. 3. A predictor is an attribute that may be directly used to determine a priority. For example, a set of storage attributes may be filtered to determine a subset, e.g., a set of predictors. The predictors may be input to a model to determine a priority, as more fully described with respect to FIG. 3. The block size may indicate the operation type such as transactional data (which may be more sensitive and prioritized for data protection) or analytical data (which may be less sensitive than transactional data). The name cluster length may indicate the proportion of a VMs dedicated to a particular use. The derived storage attributes may be used to determine a data protection priority, which in turn may be used to determine a recommendation of a data protection operation as more fully described with respect to recommendation engine 218. For example, derived storage attributes may indicate the primary use of a VM or importance of data associated with a VM.

Recommendation engine 218 is configured to determine a data protection priority based at least in part on the storage attributes collected and/or derived by attribute engine 216. A data protection priority indicates whether data is important or not important for a data protection operation. A higher priority (e.g., corresponding to more important data) causes associated data to be prioritized for a data protection operation. For example, transactional data, which is typically more sensitive and leads to greater consequences if lost than analytical data, has a relatively high priority. A data protection priority may be scored, ranked, or otherwise represented by a value that allows priorities of various VMs to be measured against each other.

Recommendation engine 218 is configured to determine a recommendation of a data protection operation. Data protection operations include measures, schedules, procedures, or the like performed to facilitate data protection. An example of a data protection operation is taking a snapshot of a particular set of data at a specific time. A snapshot of data of higher priority is taken before or more frequently than a snapshot of data of lower priority is taken. The recommendation may be binary (e.g., yes/no to perform a protection measure) or a periodicity by which to perform the protection measure (e.g., every minute, hourly, daily, weekly, monthly, quarterly). As more fully described with respect to FIG. 3, a data protection operation recommendation is made by taking in an attribute and outputting a recovery point objective (RPO).

Recommendation engine 218 may make determinations about priority and recommendation for data protection operations using a machine learning model, as more fully described with respect to FIG. 3. For example, recommendation engine 218 may send one or more storage attributes and/or priorities to a machine learning model and receive a priority or recommendation from the machine learning model. The machine learning model may be provided locally or remotely. In some embodiments, a model is specific to a file store. In some embodiments, a model applies to more than on file store such as for several hosts or VM owners. For example, data can be anonymized over several VM owners. In some embodiments, a model applies per host. A model captures whether a VM is to be protected based on a user's setting or behavior. For example, a user may first have 500 to 50,000 IOPS being critical (e.g., by indicating this or by behaving this way). Later, anything beyond 40,000 IOPS is not critical. The critical range may then be updated to 500 to 40,000 TOPS.

The recommendation engine 218 may make its recommendations on a per user basis (e.g., for a particular VM owner, enterprise, or customer) or may make its recommendations on a per user type basis (e.g., for a group of VM owners such as computer security firms being one group, software startups less than 2 years old being another group, Fortune 500 companies, etc.).

Recommendation engine 218 may allow removal of some storage attributes and update/provide its recommendation accordingly, as more fully described with respect to FIG. 3. The recommendation engine 218 may receive feedback such as whether a user agrees with the recommendation or satisfaction/level of agreement with the recommendation to adjust its recommendation decision process for future recommendations. For example, a machine learning model may be retrained with feedback as additional training data.

FIG. 3 is a flow chart illustrating an embodiment of a process for providing automatic data protection for virtual machines. Process 300 may be implemented by components of system management 210 such as attribute engine 216 and recommendation engine 218 shown in FIG. 2.

In the example shown, the process begins by collecting storage attributes (302). Example attributes include the (total) number of VMs, space provisioned such as memory used per VM or per host, space assigned, read and write IOPS, latency, and the like. Total VMs is a number of total VMs, which can be used to calibrate a scale for other VM-related metrics. In various embodiments, slices of data are collected periodically such as IOPS or memory used at runtime. The data can be collected periodically such as every 10 minutes, and averaged to obtain a single value for a period of time such as a day (24 hours). An example of data slices is described with respect to FIG. 4.

The process derives storage attributes as appropriate (304). For example, attributes that might be useful for determining a data protection priority but not readily available may be derived from collected attributes. In some embodiments, based on derived storage attributes, VMs may be ordered by size to determine a rank of the VM, where the rank indicates the proportion of system space used by the VM. As another example, a particular user having one or more VMs may be evaluated to determine a difference between that user and the largest user (e.g., the user with the largest filesystem).

An example of a derived attribute is block size. Block size is an estimate of application block size such as I/O request size used by a VM. In various embodiments, block size may be indicative of application characteristics, which may inform the determination of a data protection priority assigned to the application for protection. For example, Online Transaction Processing (OLTP) applications typically use smaller block sizes compared with Online Analytical Processing (OLAP). In various embodiments, OLTP applications are prioritized for protection. A larger block size may indicate a backup data, which receives a lower priority because it is redundant data.

Another example of a derived attribute is name cluster. Name cluster is a measure of similarity between names of VMs. For example, in various embodiments, VMs belong to a name cluster such as "production," "test," or other predetermined or user-defined name. Table 1 shows an example of VM names and associated name cluster length. In various embodiments, similarity is determined based on the prefix of a name. In this example, a four letter prefix of a name is used to determine similarity. The prefix associated with the name is listed in the same row as the corresponding VM Name. For each of the first two entries ("ProductionSQL1" and "ProductionSQL1"), the prefix is "prod." For the remaining three entries, the prefix is "test." In this group, there are five entries, two of which share the same prefix "prod," and three of which share the same prefix "Test." Thus, the name cluster length for the first two entries is ⅖ and the name cluster length for the remaining three entries is ⅗. This may indicate that the "Test" VMs are to be prioritized for recovery because a larger proportion of the VMs belong to this cluster. For example, based on an observation that adminstrators tend to name VMs for the same purpose with the same prefix, the primary purpose of a group of VMs can be inferred from the most common prefix. Suppose a group of VMs includes mostly test VMs and a few production VMs. The name cluster length of the test VMs would be greater than the name cluster length of the production VMs. This suggests that the primary use of the group of VMs is for test, which makes test more important to the owner of the group of VMs. Thus, a name cluster length measures an importance of a name cluster with respect to its associated VM.

TABLE 1

| VM Name | Prefix Name | Cluster Length |
|---|---|---|
| ProductionSQL1 | Prod | 2/5 |
| ProductionSQL2 | Prod | 2/5 |
| TestSQL1 | Test | 3/5 |
| TestSQL2 | Test | 3/5 |
| TestSQL3 | Test | 3/5 |

The process determines a data protection priority based on the collected and/or derived storage attributes (306). In various embodiments, storage attributes may be weighted and/or combined to determine priority. For example, read/write IOPS is a relatively important metric, space provision indicates how much of memory is allotted to a particular use, total latency indicates how idle a VM is (more idle VMs are, in various embodiments, assigned a lower priority), and the space used compared with other VMs indicates importance (VMs that use relatively more space are, in various embodiments, assigned a higher priority).

Figure 5:
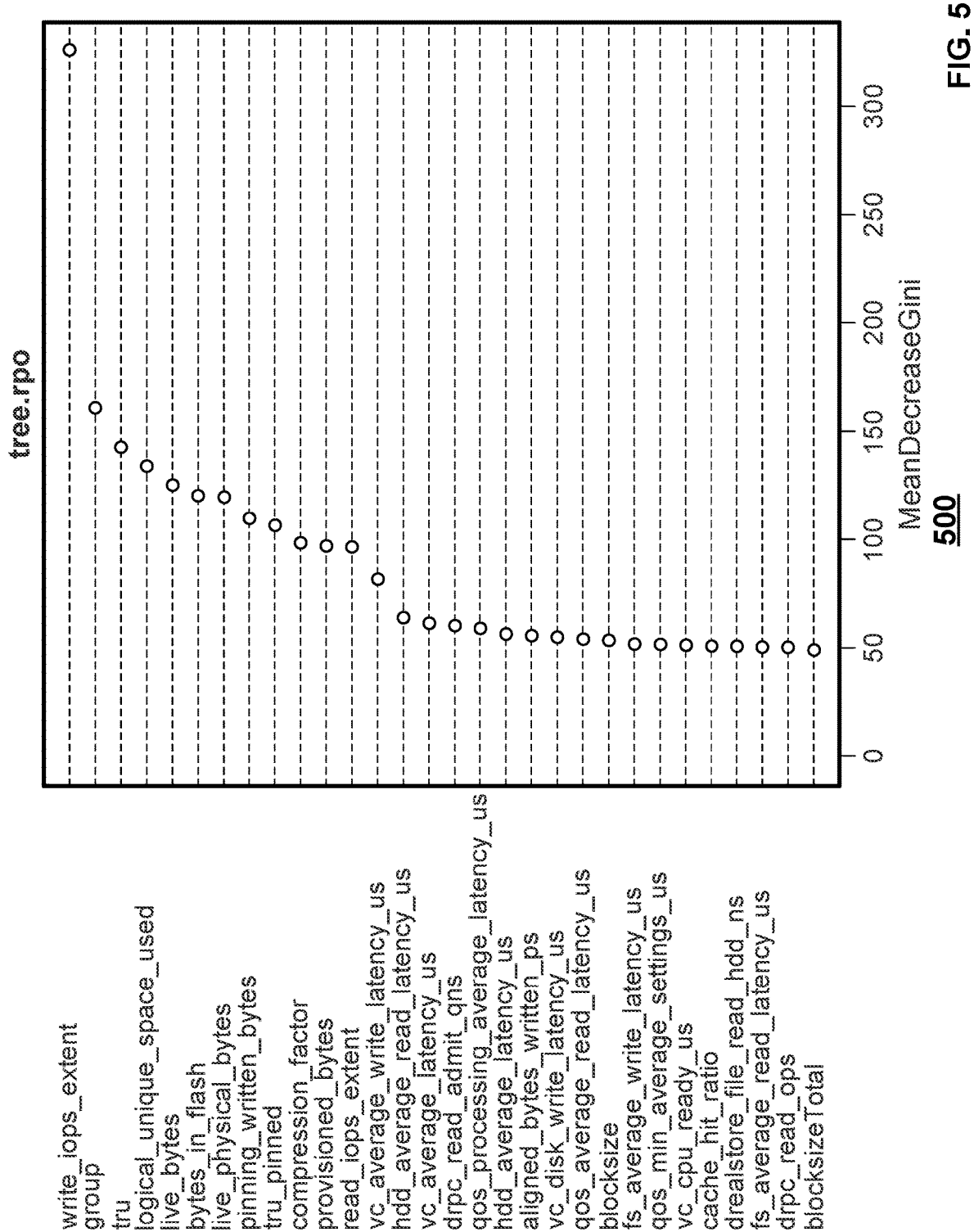
FIG. 5 illustrates predictors determined by the process shown in FIG. 3.

In various embodiments, a subset of collected and/or derived storage attributes are used to determine a data protection priority. Attributes in the subset of storage attributes are sometimes called "predictors." A predictor is a storage attribute that is considered more relevant for determining a data protection priority. In some embodiments, only predictors (instead of all collected and/or derived storage attributes) are input to a model to determine a priority. Referring to FIG. 5, in various embodiments, a few of the storage attributes listed on the y-axis may be selected to be predictors instead of using all of the storage attributes.

The process determines a recommendation of a data protection operation based on the determined priority (308). RPO calculations can be performed periodically to adapt to changing VM attributes. In some embodiments, an RPO recommendation service is configured to communicate with an aggregator, individual filesystems of various clients, and/or plug-ins. Each of the aggregator, individual filesystems, and plug-ins reports VM attributes. The aggregator aggregates attributes across several filesystems, which may be for a single VM owner or several VM owners. The plug-in is provide in external systems that uses the filesystem but not a user interface for the filesystem. The plug-in can report attributes. The RPO recommendation service aggregates the information provided and provides an RPO. For example, an aggregation of data may be used to make a recommendation. Data from a certain type of VM owner, e.g., computer security firms, may be aggregated. In some embodiments, data is anonymized before aggregating. From this, an average may be determined and a recommendation can be made. Suppose the average frequency of backing up is once a day, but one of the computer security firms backs up once a week. The RPO recommendation service can provide a recommendation to the computer security firm that backs up once a week to increase the frequency of backups based on the behavior of its similar peers.

A recommendation for a data protection operation may be determined based on the priority using a model. The model may be constructed in various embodiments by processing the data (e.g., collecting/deriving storage attributes and determining priority). The processed data is then used to construct the model. The model may be a machine learning model, data mining classifier, decision model, random forest, or the like. In various embodiments, the output of the model is an RPO and storage attributes are predictors or inputs to the model. The model may be trained at various times such as before the model is used to make a data protection priority determination. The model can be trained and improved while it is used. The decision model can be used to output a priority based on input storage attributes. For example, the RPO of a VM indicates its priority because the RPO is a measure of the sensitivity of the VM. In various embodiments, an VM with a relatively lower RPO is assigned a relatively higher priority.

An RPO is a point in time after which data may be lost without adverse effect. For example, stale data that is older than the RPO can be lost without negatively impacting operations. Using the example of disaster recovery, if a user needs the data to be no older than an hour, the RPO of the data is one hour. Backup in this situation is typically every hour to meet the specified RPO.

In some embodiments, one or more storage attributes may be removed from consideration, e.g., not used to determine a data protection recommendation. This may be indicated by a user before an initial recommendation or may be removed and an initial recommendation updated accordingly. For example, a user only interested in space metrics may remove other metrics from being considered to determine a data protection priority. A model can be trained with specified metrics by removing other metrics. The metrics used may vary per user, and may be updated via a feedback loop such as a "phone home system" shown in FIG. 4.

In various embodiments, data is periodically reported and used as feedback to improve machine learning models. For example, a phone home system such as the one shown in FIG. 4 collects data about rejected recommendations to tune the machine learning models. The recommendations may be rejected by a user interacting with the system such as via the example user interface shown in FIG. 8.

In various embodiments, a model is deployed as part of a web service with a RESTful interface. Such service can run on premise or in the cloud. The service can be provided on demand when a user instructs the service to be performed or can be performed automatically in the background and reports results (recommendations) to the user periodically such as weekly, monthly, etc. At runtime, the storage passes in VM attributes to the model and the model recommends a RPO back. This information can be presented to the user as a recommendation or alternatively, based on user choice, it can be automatically applied to configure data protection for the VM. In some embodiments, the training will happen offline and then the model will be deployed as a service.

In some embodiments, following the determination of the recommendation of a data protection operation, the process automatically performs the recommended data protection operation. For example, a snapshot is taken automatically stored in snapshots 212 shown in FIG. 2 or data is automatically replicated.

Figure 4:
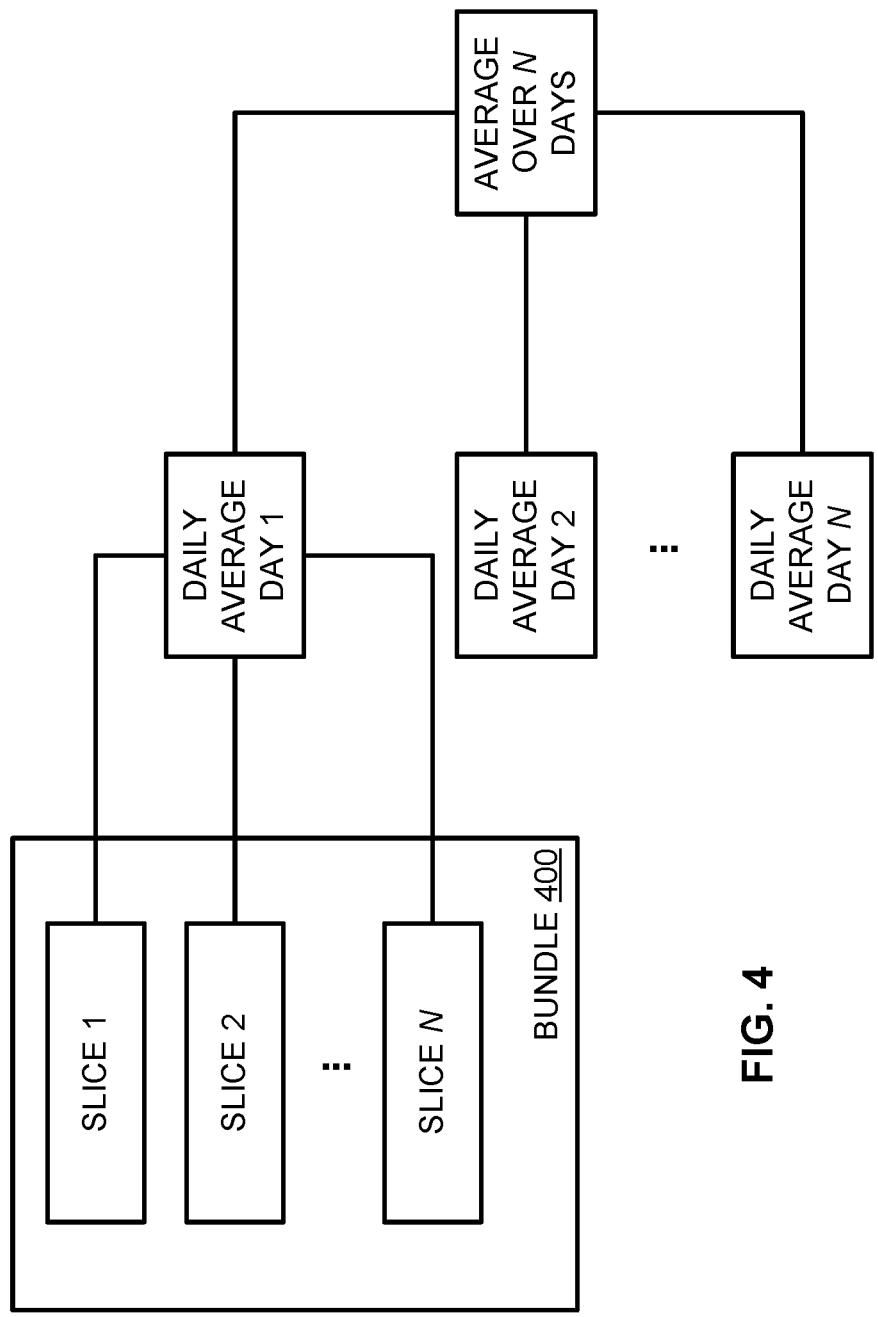
FIG. 4 is a block diagram showing an example of storage attribute collection.

FIG. 4 is a block diagram showing an example of storage attribute collection. For example, various storage attributes can be consolidated in a slice of data. In this example, a bundle 400 of data includes n slices. Each slice corresponds to data collected during a pre-defined time range. In some embodiments, VM attributes are collected every 10 mins and collected daily. Referring to FIG. 4, each slice in this example can be a 10 minute slice. In some embodiments, VM attributes are reported over a longer period of time such by taking the average of 10 slices to obtain a single value representing data collected during a 100-minute time span.

In various embodiments, a data collection pipeline aggregates and averages the collected samples (here, the 10 min slices). The data collection pipeline may further aggregate and average data over multiple days. Here, the sample of the VM is calculated by averaging slices into daily samples and then averaging the daily samples into a single sample for that VM. Map reduce techniques can be used to speed up sample collection, in some embodiments. Map reduce techniques are ways to facilitate distributed data processing. Map reduce techniques allow the processing to scale out to multiple servers, for example. Each virtual machine is, in various embodiments, represented by a single sample in the training data.

FIG. 5 illustrates predictors determined by the process shown in FIG. 3. Graph 500 is a variable importance plot showing example predictors listed in order of importance for a specific VM. Graph 500 shows the mean decrease in Gini index that is caused by each predictor. The Gini index is an example way to measure how well (e.g., accurately) a model performed. A predictor that is associated with a higher decrease is a more significant predictor.

Some of the predictors seen in the example variable importance plot will now be described. "Write_iops_extent" is a number proportional to a write back operation performed by the storage appliance. "Group" is a percentage of VMs with a similar name, as described herein with respect to "Name Cluster Length." "Tru" is a percentage of the performance capability of the array consumed by the specific VM. "Logical_unique_space_used" is uncompressed logical unique (no dedupe) space used by the VM. This can also be represented as compressionFactor*physical space used by the VM. "Live bytes" is the space (in bytes) allotted to the specific VM. "Bytes_in_flash" is the space (in bytes) allotted for fast operations. "Cache_hit_ratio" is the frequency of read/write operations.

In addition to the master model, in some embodiments, additional auxiliary models are used to make a data protection recommendation. For example, a Capacity Model models the RPO as a function of space allocation and consumption related predictors. A Performance Model models the RPO as a function of performance related predictors such as latency. A Compute Resources Model models the RPO as a function of compute resources allocated to the virtual machine. The output of all of the models is gathered to help the user interpret why the recommendation is being made.

Figure 6:
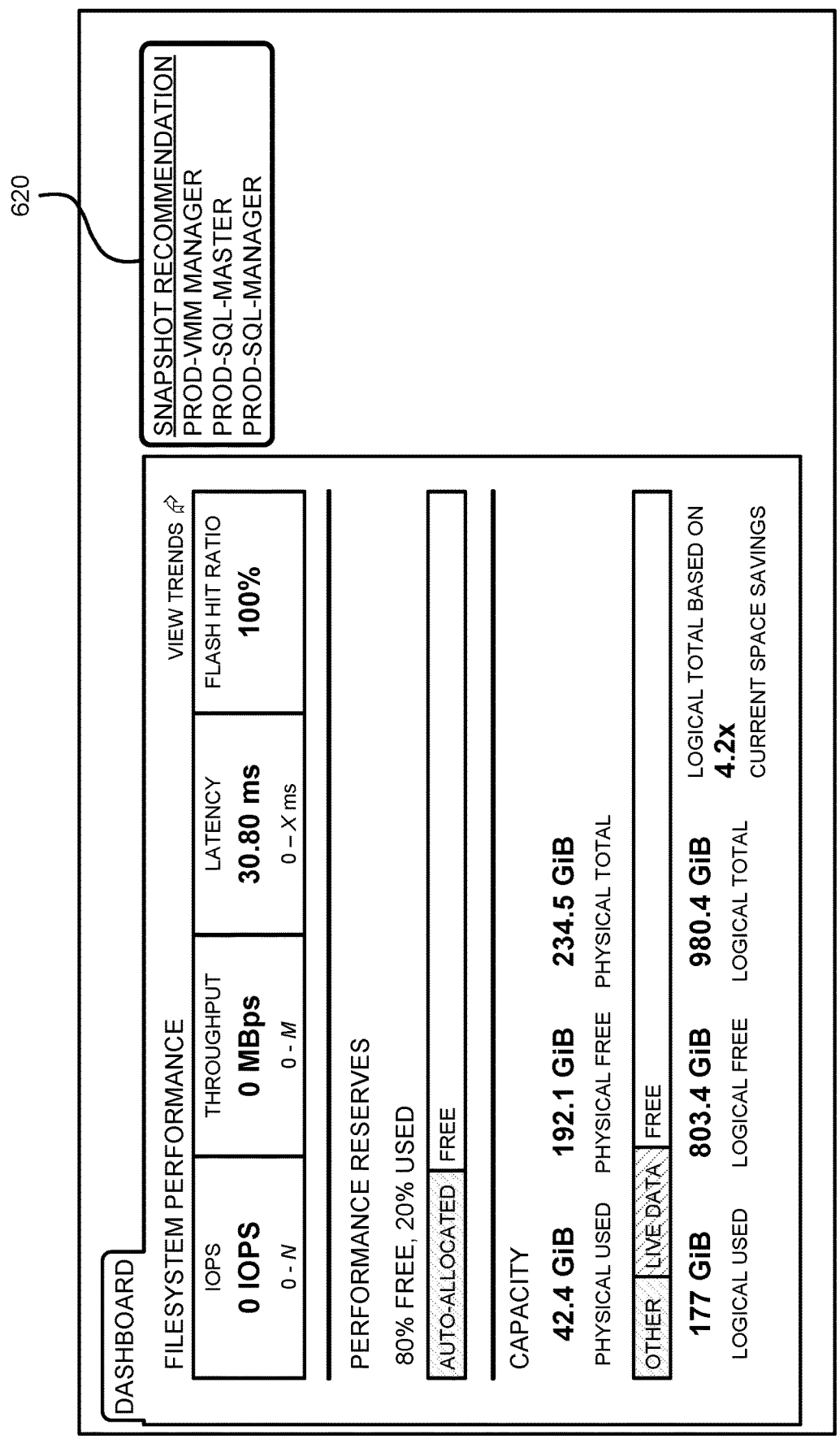
FIG. 6 is an example user interface for providing a recommendation about a data protection measure.

FIG. 6 is an example user interface for providing a recommendation about a data protection measure. Embodiments of detecting and protecting high priority virtual machines can be applied for a variety of use cases such as, for example: recommending scheduled protection for virtual machines, recommending replication for virtual machines, automatically configuring scheduled protection for virtual machines, and automatically configuring replication for virtual machines.

An example screen shot of what the first use case (recommend scheduled protection for VMs) looks like is shown in FIG. 6. This user interface 600 (UI) shows a filesystem UI with snapshot recommendations 620 displayed with its dashboard. As shown, a recommended action of setting up scheduled snapshots for VMs includes "Prod-vmm-manager," "Prod-sql-master," and "Prod-sql-manager."

In some embodiments, the recommendation is displayed with a suggested frequency of taking snapshots. For example, "Prod-vmm-manager" can be listed with "hourly," "Prod-sql-master" can be listed with "daily" because in this example, "Prod-sql-master," is of lower priority than "Prod-vmm-manager."

In some embodiments, the UI shows reasons for the recommendation such as attributes considered. In some embodiments, although a full model (e.g., a model based on several attributes) is used to determine a recommendation, only a subset of the attributes are displayed in the explanation for the recommendation. For example, those attributes that are easier to explain, more intuitive, more heavily weighted, or the like are displayed to facilitate user comprehension. Example explanations include capacity, performance, other VMs with similar characteristics such as size and operation frequency. Feedback on the recommendation may also be obtained via the UI 600. For example, a user may indicate a level of satisfaction with the recommendation.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
a processor; and
a memory coupled with the processor, wherein the memory is configured to store instructions and provide the processor with the instructions which when executed cause the processor to:

use storage attributes including a name cluster length associated with a virtual machine to determine, for the virtual machine, a data protection priority defining a priority of backing up a particular set of data associated with the virtual machine including by assigning a higher data protection priority for the virtual machine in response to a determination that the name cluster length of the virtual machine is greater than a name cluster length of at least one other virtual machine, wherein virtual machines are grouped into a same cluster based at least in part on a same prefix in a name of a virtual machine, the name cluster length of a virtual machine being determined by a ratio of (i) a number of virtual machines with a same prefix to (ii) a total number of virtual machines; and determine a recommendation of a data protection operation to be taken with respect to the virtual machine based at least in part on the determined data protection priority, wherein the data protection operation includes taking a snapshot of the particular set of data at a specific time.

2. The system of claim 1, wherein the processor is part of a storage system that collects attributes on a per-virtual machine basis.

3. The system of claim 1, wherein the determined data protection priority is based at least in part on a recovery point objective (RPO).

4. The system of claim 3, wherein the RPO is a length of time.

5. The system of claim 3, wherein the processor is further configured to model the RPO as a function of the storage attributes.

6. The system of claim 3, wherein the processor is further configured to model the RPO as a function of space consumption.

7. The system of claim 1, wherein the processor is further configured to determine the storage attributes to be used from a larger set of storage attributes.

8. The system of claim 1, wherein the snapshot captures a state of the particular set of data at the specific time.

9. The system of claim 1, wherein the data protection operation includes replication of data.

10. The system of claim 1, wherein the processor is further configured to collect the storage attributes.

11. The system of claim 1, wherein the processor is further configured to derive at least some of the storage attributes based on collected storage attributes.

12. The system of claim 1, wherein the storage attributes include block size and the processor is further configured to:
    assign a higher data protection priority in response to the operation type associated with the particular set of data being transactional data; and
    assign a lower data protection priority in response to the operation type associated with the particular set of data being analytical data.

13. The system of claim 1, wherein the storage attributes includes an anonymization of attributes across a plurality of VM owners.

14. The system of claim 1, further comprising updating the recommendation based on user feedback.

15. The system of claim 1, further comprising updating the recommendation in response to an indication to remove at least one of the storage attributes from being considered.

16. The system of claim 1, further comprising outputting the recommendation on a graphical user interface.

17. The system of claim 1, further comprising automatically performing the recommended data protection operation.

18. The system of claim 1, wherein the recommendation of a data protection operation to be taken includes a frequency of taking the snapshot of the particular set of data at specific times to back up the particular set of data.

19. The system of claim 1, wherein the memory is further configured to provide the processor with instructions which when executed cause the processor to: determine a subset of the storage attributes for determining a data protection priority and using only those storage attributes in the determined subset to determine the data protection priority.

20. The system of claim 1, wherein the storage attributes are automatically associated with a specific virtual machine by a filesystem configured to associate stored data objects with a specific virtual machine in a storage system.

21. A method comprising:
    determining, by a processor, a data protection priority for a virtual machine using storage attributes including a name cluster length associated with the virtual machine, the data protection priority defining a priority of backing up a particular set of data associated with the virtual machine including by assigning a higher data protection priority for the virtual machine in response to a determination that the name cluster length of the virtual machine is greater than a name cluster length of at least one other virtual machine, wherein virtual machines are grouped into a same cluster based at least in part on a same prefix in a name of a virtual machine, the name cluster length of a virtual machine being determined by a ratio of (i) a number of virtual machines with a same prefix to (ii) a total number of virtual machines; and
    determining, by the processor, a recommendation of a data protection operation to be taken with respect to the virtual machine based at least in part on the determined data protection priority, wherein the data protection operation includes taking a snapshot of the particular set of data at a specific time.

22. A computer program product embodied in a non-transitory computer readable storage medium and comprising computer instructions for a processor to:
    use storage attributes including a name cluster length associated with a virtual machine to determine, for the virtual machine, a data protection priority defining a priority of backing up a particular set of data associated with the virtual machine including by assigning a higher data protection priority for the virtual machine in response to a determination that the name cluster length of the virtual machine is greater than a name cluster length of at least one other virtual machine, wherein virtual machines are grouped into a same cluster based at least in part on a same prefix in a name of a virtual machine, the name cluster length of a virtual machine being determined by a ratio of (i) a number of virtual machines with a same prefix to (ii) a total number of virtual machines; and
    determine a recommendation of a data protection operation to be taken with respect to the virtual machine based at least in part on the determined data protection priority, wherein the data protection operation includes taking a snapshot of the particular set of data at a specific time.

* * * * *

UNITED STATES PATENT AND TRADEMARK OFFICE
CERTIFICATE OF CORRECTION

| | |
|---|---|
| PATENT NO. | : 10,872,099 B1 |
| APPLICATION NO. | : 15/877072 |
| DATED | : December 22, 2020 |
| INVENTOR(S) | : Geeta Gharpure et al. |

It is certified that error appears in the above-identified patent and that said Letters Patent is hereby corrected as shown below:

In the Specification

In Column 7, Line(s) 33, delete "adminstrators" and insert --administrators--, therefor.

Signed and Sealed this
Nineteenth Day of April, 2022

Katherine Kelly Vidal
*Director of the United States Patent and Trademark Office*